United States Patent [19]

Piatt et al.

[11] Patent Number: 4,750,005

[45] Date of Patent: Jun. 7, 1988

[54] CONTINUOUS INK JET PRINTER'S SELECTABLE INK CIRCULATION SUBSYSTEMS

[75] Inventors: Michael J. Piatt, Enon; Kevin L. Houser, Kettering, both of Ohio

[73] Assignee: Eastman Kodak Company, Rochester, N.Y.

[21] Appl. No.: 945,266

[22] Filed: Dec. 22, 1986

[51] Int. Cl.[4] .......... G01D 15/18; E03B 5/00; F16D 27/08; F04B 49/06

[52] U.S. Cl. .......... 346/75; 346/140 R; 192/48.2; 137/566; 137/567; 137/568; 417/44; 417/429

[58] Field of Search .......... 346/75, 140 R; 137/566, 137/567, 568; 417/44, 429; 192/48.2

[56] References Cited

U.S. PATENT DOCUMENTS 2,922,372 1/1960 Dorer .......... 417/6

3,101,628 8/1963 Shelley et al. .......... 74/665 R 3,547,240 12/1970 Holper .......... 192/48.2

3,718,211 2/1973 Schubert et al. .......... 192/12 D 3,932,068 1/1976 Zimmermann .......... 417/420

4,009,921 3/1977 Krohn et al. .......... 417/43

4,413,267 11/1983 Hein .......... 346/75

*Primary Examiner*—E. A. Goldberg

*Assistant Examiner*—Gerald E. Preston

*Attorney, Agent, or Firm*—John D. Husser

[57] ABSTRACT

A selective drive transmission system for continuous ink jet printing apparatus of the type having a plurality of discrete ink circulation subsystems, each including an ink supply, a print head for directing droplet streams toward a print medium and pump means for pumping ink from its respective supply to its respective print head. The transmission system discretely couples and decouples the plurality of pump means discretely vis-a-vis a common motor source of the rotary drive.

4 Claims, 3 Drawing Sheets

CONTINUOUS INK JET PRINTER'S SELECTABLE INK CIRCULATION SUBSYSTEMS

BACKGROUND OF THE INVENTION

1. Field of the Invention

The present invention relates to continuous ink jet printers of the kind having plurality of ink supply and circulation subsystems (e.g. to enable different color ink printing) and more particularly to constructions for providing selective operation of those systems.

2. Background Art

In continuous ink jet printing apparatus ink is pumped, through a supply line from a supply reservoir, to a print head under sufficient pressure to cause ink streams to issue from the orifices of the print head. Stimulating vibrations are applied to the print head to cause the ink streams to form streams of uniformly sized and spaced droplets, which are electrically controlled into printing or non-printing paths. The non-printing droplets are caught in a catcher device and can be returned to the supply reservoir by a catcher return line, which can be coupled to a main return line.

Continuous ink jet printing systems have been proposed wherein a plurality of discrete orifice arrays cooperate in printing on a common print medium, e.g. to allow the use of different ink colors or to increase printing speed and/or printing resolution. These multi-head systems, in general, utilize separate and completely duplicative ink circulation systems for each separate print head. That is, each circulation system has a separate pump motor and a separate pressure control system.

Our concurrently filed U.S. application Ser. No. 945,265, entitled "Pressure Regulation System for Multi-Head Ink Jet Printing Apparatus" by M. Piatt and K. Houser discloses unique structural and functional approaches for reducing the pressure regulation components in a continuous, multi-head ink jet printer. These approaches also provide performance advantages, e.g. from the viewpoints of accuracy in drop placement and flexibility in drop stimulation. The pressure regulation system described in that concurrently filed application enables a single motor to operate a plurality of ink circulation systems for a continuous, multi-head printer.

SUMMARY OF INVENTION

One important purpose of the present invention is to provide an assembly for selectively coupling the plurality of discrete ink circulation subsystems of such a multi-head printer to a common motor drive.

In one aspect the present invention provides in continuous ink jet printing apparatus of the type having a plurality of discrete ink circulation subsystems, each including an ink supply, a print head for directing droplet streams toward a print medium and pump means for pumping ink from its respective supply to its respective print head, the improvement comprising: (a) motor means for producing rotary drive; and (b) transmission means for discretely coupling and decoupling the plurality of pump means discretely vis-a-vis the rotary drive.

BRIEF DESCRIPTION OF THE DRAWINGS

The subsequent description of preferred embodiments refers to the attached drawings wherein.

DETAILED DESCRIPTION OF THE PREFERRED EMBODIMENTS

Figure 1:
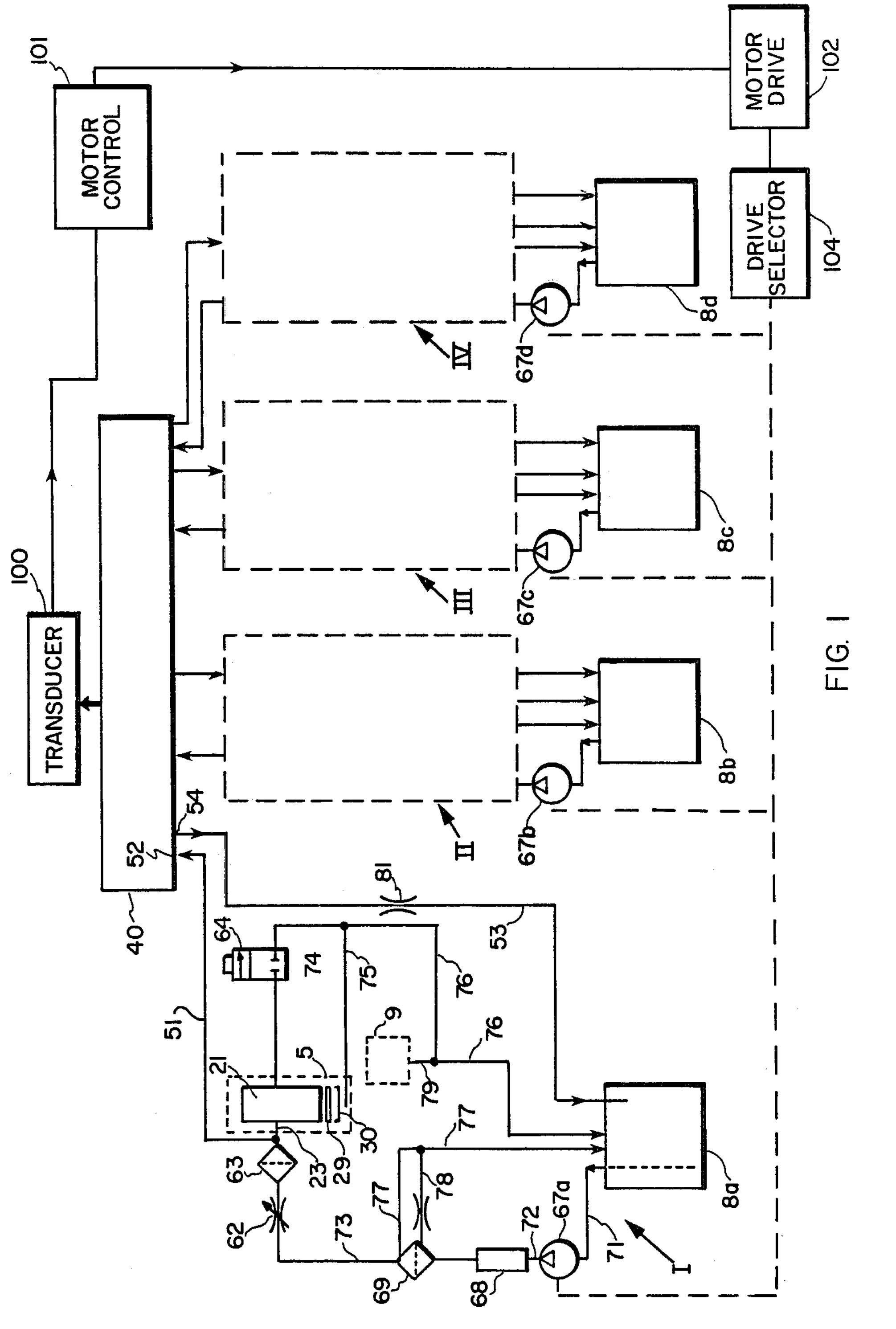
FIG. 1 is a schematic diagram illustrating one preferred system application of the present invention.

FIG. 1 illustrates the present invention as employed in a continuous ink jet printer system comprising four distinct ink circulation subsystems I–IV, respectively for effecting the supply and return of ink between each subsystem ink reservoir 8 and subsystem print station 5. In the illustrated embodiments the details of subsystems II–IV (not shown) are substantially identical to those of subsystem I.

As illustrated schematically, the subsystems' print head assembly 5 includes a print head body 21 having an inlet for receiving ink and orifices for directing droplet streams past a charge plate assembly 29 and either onto a print medium or into a catcher assembly 30 for return to the ink reservoir. In the illustrated embodiment, each print head assembly 5 is adapted for traversing movement across a print path and to a start-up/storage position over a home station 9. It is to be noted however, that the concepts of the present invention are equally useful to continuous ink jet print systems wherein the printing orifices do not traverse the print path.

By way of general technical background, the upper print head portion also includes a suitable transducer means (not shown) for imparting mechanical vibration to the print head body. Such transducer can take various forms known in the art for producing periodic perturbations of the ink filament(s) issuing from the orifice plate to assure formation break-up of the ink filaments into streams of uniformly spaced ink droplets. One preferred kind of construction for the print head body and transducer is disclosed in U.S. application Ser. No. 390,105, entitled "Fluid Jet Print Head" and filed June 21, 1982, now continuation-in-part, Ser. No. 06/777,102 filed Sept. 17, 1985 in the name of Hilarion Braun; however, a variety of other constructions are useful in accord with the present invention. Preferred orifice plate constructions for use in accord with the present invention are disclosed in U.S. Pat. No. 4,184,925; however, a variety of other orifice constructions are useful.

The lower portion of print head assembly 5 includes a charge plate 29 constructed to impart desired charge upon ink droplets at the point of filament break-up and a drop catcher 30 that is constructed and located to catch non-printing droplets (in this arrangement charged droplets). Exemplary preferred charge plate constructions are disclosed in U.S. Pat. No. 4,223,321; however, other charge plate constructions are useful in accord with the present invention. Exemplary catcher configurations are described in U.S. Pat. Nos. 3,813,675; 4,035,811 and 4,268,836; again other constructions are useful.

During the printing operation ink filaments are ejected through the orifices in plate and, under the influence of the transducer on the print head, break up into streams of uniformly sized and spaced droplets. The charge plate is located proximate the zone of filament break-up and is adapted to selectively charge or not charge each droplet in each of the streams in accordance with information signals respectively transmitted to the various charge sectors of the charge plate. The charged droplets are deflected to catcher 30 for recirculation back to the ink print head, while uncharged droplets pass on to the print substrate.

The ink supply and circulation subsystems shown in FIG. 1 include various ink conduits or "lines" which form the ink circulation path. Specifically, pump inlet line 71 extends from ink supply reservoir 8 to the inlet of pump 67, pump outlet line 72 extends between pump 67 and main filter 69, head supply line 73 extends from main filter 69 to the print head inlet and head return line 74 extends from the print head outlet to a junction between catcher return line 75 and the main ink return line 76. The main return line 76 is also connected to home station return line 79. An air bleed line 78 and an ink bypass line 77 extend from main filter 69 back to reservoir 8. As will be clear from the subsequent description, the present invention is highly useful in, but not limited to use with, the particular ink circulation line arrangement shown in FIG. 1. Other elements of the FIG. 1 embodiment such as ink heater 68, variable flow restrictor 62, final filter 63 and head return valve 64 are not necessary for the practice of the present invention, but can be usefully incorporated with it.

Also, it can be seen in FIG. 1 that each of the ink circulation subsystems I–IV comprise a pressure detection bypass branch extending to and from a pressure referencing assembly, denoted generally 40. For example, the subsystem I branch comprises an ink egress line 51 extending from a junction with its ink supply line 73 (that is immediately upstream of the print head inlet 23) to an inlet 52 to assembly 40 and an ink ingress line 53 extending from an outlet 54 of assembly 40 back to its ink supply reservoir 8. Each of the ingress lines include a flow restrictor, e.g. 81.

The detailed structure and function of the FIG. 1 pressure regulation system is described in U.S. application Ser. No. 945,265, entitled "Pressure Regulation System for Multi-Head Ink Jet Printing Apparatus", filed Dec. 22, 1986 by M. J. Piatt and K. L. Houser. In general the pressure referencing assembly 40 comprises discrete ink-flow chambers which are incorporated respectively in the bypass branches of subsystems I–IV so that ink flowing through those branches passes through their respective ink-flow chamber. The upper portion of assembly 40 is formed as a common pressure reservoir, which is separated from each of the ink flow chambers respectively by resilient membranes and which has an opening communicating with a pressure transducer 100. The reservoir contains a compressible gas and a liquid. Transducer 100 is constructed to detect a change in pressure in assembly 40 (e.g. a drop below a nominal pressure) and to provide an appropriate electrical signal to motor control circuit 101. In response to such signal from transducer 100, control circuit 101 appropriately adjusts the speed of motor 102. As indicated schematically by the dotted lines in FIG. 1, motor 102 is mechanically coupled by means of a drive selector 104, constructed according to the present invention to selectively drive the pumps 67*a*–67*d* of each of the subsystems I–IV. During printing operations of the ink systems, the pressure conditions of the ink fow are imparted through the pliant membranes to the common pressure reservoir. The pressure condition in the reservoir is detected by transducer 100 and utilized to control the motor 102 to maintain the pressure at each of the print head inlets 23 at the same and proper operating pressure.

In certain modes of operation of the FIG. 1 system it may be desired to operate less than all four of the subsystems I–IV. For example, it may be desired to use only one system for wholly black output. Or, it might be desired to operate two systems for black text and red highlighting. Or, it might be desired to operate three systems for black text, highlighting and a different color logo. When printing a large number of documents that use less than all ink systems, it is wasteful, e.g. from the viewpoints of energy and equipment wear, to maintain the circulation of ink in non-used subsystems. For example, if an unused subsystem is circulating ink in a catch all drops mode, rather than being inactivated in accord with the present invention, ink foam, crooked jets, filler life decrease and charge plate shorting are all increased. Also such circulation can cause problems regarding water evaporation from ink in a subatmospheric supply reservoir.

Figure 2:
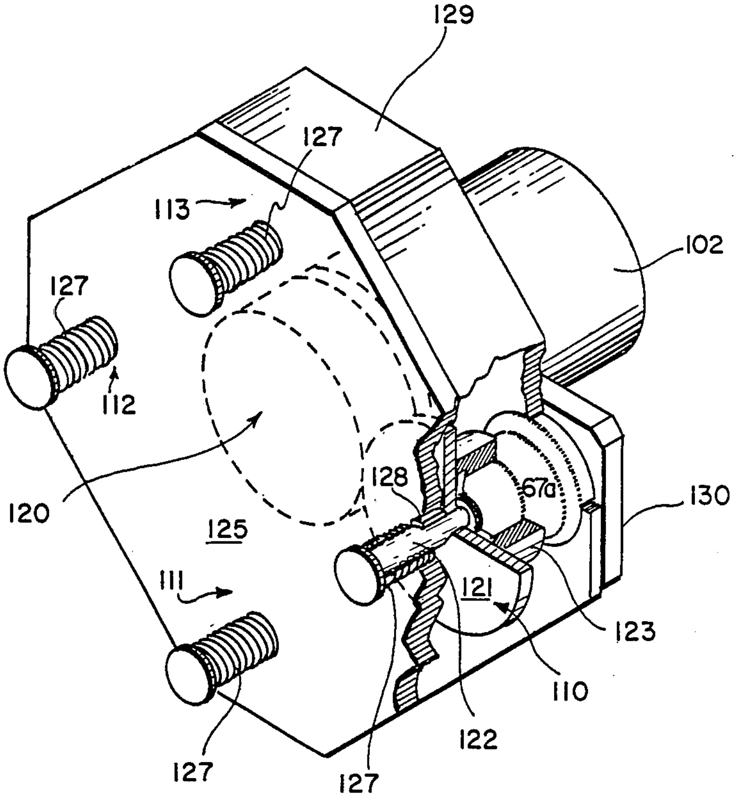
FIG. 2 is a perspective view, with portions broken away, illustrating the details of one preferred drive selector embodiment in accord with the present invention.

The present invention, as illustrated by the drive selector embodiment shown in FIG. 2, provides for the selective activation of desired ink circulation subsystems, while allowing the advantages of a common motor drive for all subsystems. In general, the drive selector 104 comprises four identical drive transmission systems, designated generally 110, 111, 112 and 113 for selectively coupling the rotary drive from motor 102 to the pumps 67*a*–67*d* of the FIG. 1 system. As shown in FIG. 2 with respect to drive transmission system 110 and pump 67*a*, each transmission system includes a driven gear 121 engaged with a central drive gear 120 coupled to the output shaft (not shown) of motor 102. The driven gear 121 is rotatably mounted on a lower portion of shaft 122. A magnetic drive cap 123 is affixed (e.g. by integral molding, adhesive or mechanical connections) to the lower surface of driven gear 121 for rotation therewith on the axis of shaft 122. The gear 121 and cap 123 can be held in the desired axial position on shaft 122 by sandwiching retaining spring structure. The shaft 122 is mounted for sliding movement in the top plate 125 of the drive selector housing between the position shown in FIG. 2 (with the magnetic cap 123 spaced from the pump 67*a* to a drive engaging position wherein the magnetic cap encloses the top of pump 67*a*). As shown, the central drive gear 120 has a substantial thickness to its gear profile so that driven gears 121 remain in drive transmission relation therewith during their translations between pump driving and non-driving positions.

Coil springs 127 bias each of the shafts toward the spaced (disengaged) positions shown in FIG. 2. Each shaft 122 includes a keyed portion 128 which is constructed to slide through the thickness top plate 125 when the shaft is moved to the drive engaging position. Upon rotation of the shaft with the key portion 128 beyond the plate 125, the shaft will be retained in its drive engaging position.

Figure 3:
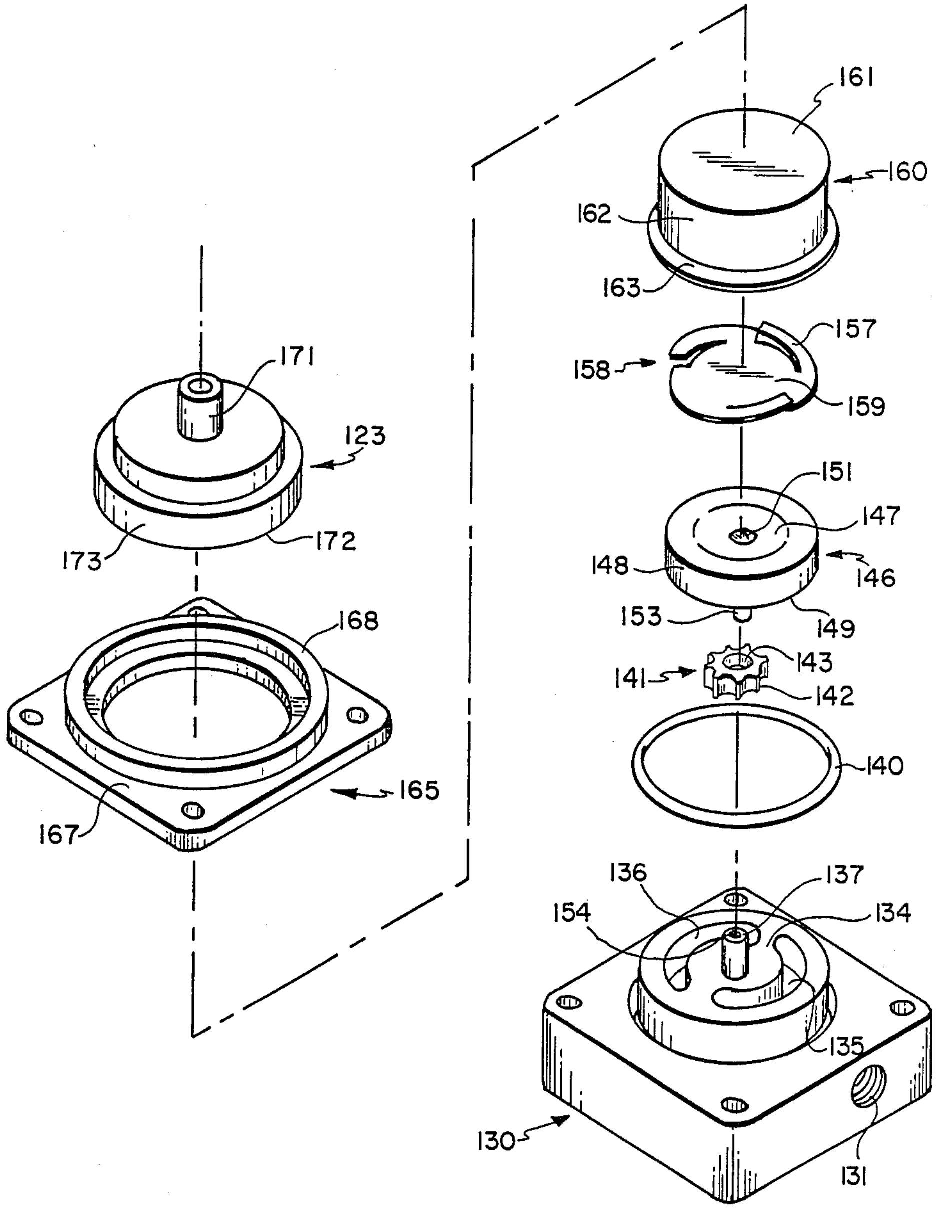
FIG. 3 is a perspective exploded view of one preferred pump embodiment for use in accordance with the present invention.

As illustrated in FIG. 2, the base 130 of each fluid pump, e.g. 67*a*, is affixed to the bottom wall 129 of the drive selector housing and a top portion of each pump extends within that housing for magnetic engagement by the magnetic caps 123. FIG. 3 illustrates the construction of the pumps and their cooperative drive caps in more detail.

Thus, the magnetic drive gerotor pump of FIG. 3 comprises a base member 130 which comprises a main body having a side outlet port 131 and a bottom inlet port (not shown). The pump body has a raised central portion which has a top that provides a machined bearing surface 134 on which gerotor gear elements can rotate smoothly. The bearing surface 134 has arcuate slot opening 135 and 136 on opposite sides of a central hub 137. The slot opening 135 is connected by an outlet passage within the main body to the outlet port 131 and opening 136 similarly is connected by an inlet passage to an inlet port (not shown). A circular recess is provided around the raised portion of the pump body to receive sealing ring 140.

A male gerotor member 141 comprises a gear toothed peripheral portion 142 and a central bore portion 143 that is adapted to fit rotatively around hub 137. The cooperative female gerotor tooth profile is formed on the underside of female gerotor member 146. As shown, the member 146 comprises top and side wall portions 147, 148 and has a precision bottom surface 149 skirting the female gear profile and adapted to rotate smoothly on bearing surface 134. The member 146 also has a spherical raised portion 151 formed on its top and a central axle portion 153 that extends normally to the gear plane and is adapted to rotate in bearing cavity 154 formed within hub 137. The bearing recess 154 is offset from the center of hub 137. This offset is designed in accordance with known gerotor pump principles, and with the gear teeth profiles, so that during one complete revolution of the outer, female gerotor member, the inner, male member advances one tooth with respect to the outer member. That is, the inner member 141 has one less tooth than the outer member 146 and the advance of the one tooth per revolution advance of inner member provides a positive displacement pumping of fluid from the inlet slot 136 to the outlet slot 135.

A spring disc member 158 has a flat central portion 159 adapted to press on raised portion 151 of member 146 and flexible peripheral sectors 157 that are raised to resiliently engage the interior of top surface 161 of cap 160. Cap 160 also comprises a cylindrical side wall portion 162 and a flange portion 163 adapted to rest on sealing ring 140. Collar member 165 has a central opening which fits over cap 160 and a mounting portion 167 for securing collar member 165 to base member 130 in a manner pressing flange 163 against seal 140. Collar member 165 also has a raised bearing surface 168 for supporting the magnetic driving cap 123 of its drive selector transmission system.

Driving member 123 has a top portion 171 coupled to gear 121 for rotation on shaft 122 and an interior bore 172 that is formed to receive the portion of cap 160 when moved to the drive engaging position. Driving member 123 further comprises a peripheral flange portion 173 which includes means for producing a magnetic field extending through the cap member 160 to transmit its rotation by magnetic attraction to female gerotor member 146. In this regard flange portion 173 is formed of a magnetizable material and at least the outer peripheral portion 148 of gerotor member 146 is similarly magnetizable. Both members are magnetized and cap 160 is formed of magnetically transmissive material so that magnetic field couples members 146 and 123. Thus, upon rotation of member 123, the female gerotor member is rotatively driven to effect pumping operation of the gerotor elements.

In operation, when motor 102 is energized, the central gear 120 on its output shaft will drive the four driven gears 121, engaged around its periphery, on their respective shafts 122. The shafts 122 of selected ones of the transmission systems 110–113 are preferably moved into the drive selector housing as described above to effect magnetic coupling between their respective magnetic drive caps 123 with the female gerotor element 146 of their driven pump prior to motor energization to assure magnetic coupling. The selected ones of the circulation subsystems I–IV will then commence to stabilize at the proper nominal pressure under the control of pressure regulation system 40, transducer 100 and motor control 101. When this pressure condition has been attained, printing will commence with the print heads of the selected subsystems. When it is desired to change the selection of operative subsystems, predetermined ones of the shafts 122 are relocated in regard to their drive transmitting or non-transmitting position and the pressure regulation is allowed to restabilize at the nominal operating pressure. Thus it will be appreciated that the ends of control shafts 122 can be located in a control panel providing ready access to an operator, and the present invention therefore provides a convenient and reliable construction for selectively enabling desired ones of the multiple circulation subsystems of the printer.

The invention has been described in detail with particular reference to preferred embodiments thereof, but it will be understood that variations and modifications can be effected within the spirit and scope of the invention. For example, the present invention can be practiced with other type of gear pumps and with other pumps designed for liquids and gases.

We claim:

1. In continuous ink jet printing apparatus of the type having a plurality of discrete ink circulation subsystems, each including an ink supply, a print head for directing droplet streams toward a print medium and pump means for pumping ink from its respective supply to its respective print head, an improved ink circulation control subsystem comprising:

(a) motor means for producing a variable-speed rotary drive;

(b) a pressure regulation subsystem including: (i) a pressure detection reservoir; (ii) a plurality of pressure detection branch conduits respectively extending from said discrete circulation subsystems to said detection reservoir and (iii) detection and control means, coupled to said pressure detection reservoir, for varying the rotary drive of said motor in response to pressure variations in said reservoir; and (c) transmission means for selectively coupling, and decoupling, each of said pump means discretely to, and from, said rotary drive.

2. The invention defined in claim 1 wherein said transmission means comprises:

(a) a central drive gear coupled to said motor means and rotatable on a central axis;

(b) a plurality of pump drive gears drivingly engaging peripheral sectors of said central drive gear and rotatable on a drive axis parallel to said central axis;

(c) a plurality of pump drive shafts each supporting a respective pump drive gear and being translatable along said drive axis; and (d) a plurality of magnetic drive members coupled for rotation with said pump drive gears and movable by translation of said shafts between drive-transmitting and spaced relations with the pump means of respective circulation systems.

3. The invention defined in claim 2 wherein said central drive gear has a thickness such that said pump drive gears maintain engagement therewith during the translative movement of said drive shafts.

4. In continuous ink jet printing apparatus of the kind having a plurality of discrete ink circulation subsystems that respectively circulate different color inks to different ink jet print heads and in which each such circulation subsystem includes a separate pump means for delivering ink to its print head, an improved ink circulation control subsystem comprising:

(a) a motor which is controllable to produce varying speed drive;
(b) means for selectively coupling any one or more of said separate pump means to said motor;
(c) a common pressure reservoir;
(d) a plurality of pressure detection branches each respectively extending from sites of their respective circulation system that are indicative of their subsystem's print head pressure to said common pressure reservoir; and
(e) detection and control means for controlling said motor speed in response to variations in the pressure in said common reservoir.

* * * * *